United States Patent
Hoyer et al.

(10) Patent No.: US 11,059,337 B2
(45) Date of Patent: Jul. 13, 2021

(54) SLOTTED ALIGNMENT BUSHING

(71) Applicant: GM Global Technology Operations LLC, Detroit, MI (US)

(72) Inventors: Eric B. Hoyer, White Lake, MI (US); Jack Marchel, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 16/172,035

(22) Filed: Oct. 26, 2018

(65) Prior Publication Data
US 2020/0130449 A1    Apr. 30, 2020

(51) Int. Cl.
*B60G 9/00*    (2006.01)
*B60G 7/02*    (2006.01)
*B60G 7/00*    (2006.01)

(52) U.S. Cl.
CPC ............ *B60G 9/003* (2013.01); *B60G 7/001* (2013.01); *B60G 7/02* (2013.01); *B60G 2200/31* (2013.01); *B60G 2204/143* (2013.01); *B60G 2204/4104* (2013.01); *B60G 2204/44* (2013.01)

(58) Field of Classification Search
CPC .......... B60G 9/003; B60G 7/001; B60G 7/02; B60G 2204/143; B60G 2204/4104; B60G 2200/31; B60G 2204/44
See application file for complete search history.

(56) References Cited

U.S. PATENT DOCUMENTS

| | | | | |
|---|---|---|---|---|
| 3,866,938 A | * | 2/1975 | Boyd | B62D 17/00 280/86.756 |
| 3,880,444 A | * | 4/1975 | Bridges | B62D 17/00 280/86.753 |
| 4,695,073 A | * | 9/1987 | Pettibone | B62D 17/00 280/124.128 |
| 4,836,741 A | * | 6/1989 | St. Louis | E02F 3/3631 172/272 |
| 4,970,801 A | * | 11/1990 | Specktor | B62D 17/00 280/86.755 |
| 5,052,711 A | * | 10/1991 | Pirkey | B62D 17/00 280/86.753 |
| 5,104,141 A | * | 4/1992 | Grove | B60G 13/006 280/86.753 |
| 5,141,357 A | * | 8/1992 | Sherman | F16B 5/025 403/4 |
| 5,503,374 A | * | 4/1996 | Helion | B60G 7/02 267/281 |
| 5,779,260 A | * | 7/1998 | Reilly | B60G 15/07 280/86.754 |
| 5,839,846 A | * | 11/1998 | Shimada | F16C 1/14 403/164 |
| 5,927,665 A | * | 7/1999 | Grabnic | E02F 3/3604 172/272 |
| 6,409,189 B1 | * | 6/2002 | Orimoto | B60G 7/02 280/86.751 |

(Continued)

*Primary Examiner* — Paul N Dickson
*Assistant Examiner* — Timothy Wilhelm

(57) ABSTRACT

An alignment assembly for a motor vehicle includes a first bushing with a slot, the first bushing being configured to be positioned and secured to an end of a first link of a wishbone suspension assembly, and an insert that fits within the slot, the insert having a locating hole that positions a bolt within the slot for nominal caster and camber angles.

8 Claims, 5 Drawing Sheets

(56) References Cited

U.S. PATENT DOCUMENTS

| | | | | |
|---|---|---|---|---|
| 6,446,991 B1* | 9/2002 | Klais | ............... | B60G 7/02 |
| | | | | 280/124.134 |
| 6,662,681 B2* | 12/2003 | Crane | ............... | E02F 3/3613 |
| | | | | 248/200 |
| 7,083,176 B2* | 8/2006 | Soles | ............... | B60G 7/02 |
| | | | | 280/86.751 |
| 7,198,301 B2* | 4/2007 | Wozniak | ............... | B60G 3/06 |
| | | | | 280/830 |
| 7,331,588 B2* | 2/2008 | Johnson | ............... | B60G 9/00 |
| | | | | 280/124.116 |
| 7,370,868 B2* | 5/2008 | Genick, II | ............... | B60G 7/02 |
| | | | | 280/86.753 |
| 7,429,053 B2* | 9/2008 | Katagiri | ............... | B60G 7/02 |
| | | | | 180/299 |
| 7,770,311 B2* | 8/2010 | Hahnel | ............... | E02F 3/3609 |
| | | | | 37/403 |
| 8,226,091 B2* | 7/2012 | Lee | ............... | B60G 7/006 |
| | | | | 280/5.52 |
| 8,544,924 B2* | 10/2013 | Inda | ............... | B66C 1/108 |
| | | | | 294/215 |
| 9,186,944 B2* | 11/2015 | Luttinen | ............... | B60G 3/04 |
| 9,186,945 B2* | 11/2015 | Luttinen | ............... | B60G 3/06 |
| 9,452,640 B2* | 9/2016 | Mater, Jr. | ............... | B60B 35/007 |
| 2002/0071740 A1* | 6/2002 | Ward | ............... | F16B 37/00 |
| | | | | 411/427 |
| 2005/0062248 A1* | 3/2005 | Winkler | ............... | B60G 7/008 |
| | | | | 280/86.758 |
| 2008/0174082 A1* | 7/2008 | Bunker | ............... | B60G 7/001 |
| | | | | 280/124.109 |
| 2015/0224843 A1* | 8/2015 | Luttinen | ............... | B60G 3/04 |
| | | | | 280/86.753 |

* cited by examiner

SLOTTED ALIGNMENT BUSHING

INTRODUCTION

The present disclosure relates to suspension alignment for a motor vehicle. More specifically, the present disclosure relates to a suspension assembly with slotted alignment bushings.

Almost all motor vehicles have suspension systems that require periodic alignment. Specifically, the camber and caster angles for each wheel require periodic adjustment such that the camber and caster angles are as close to the desired nominal values to optimize the performance of the motor vehicle, which increases fuel efficiency of motor vehicle and reduces wear of the tires.

Thus, while current suspension alignment procedures achieve their intended purpose, there is a need for a new and improved system and method for aligning motor vehicle suspensions.

SUMMARY

According to several aspects, an alignment assembly for a motor vehicle includes a first bushing with a slot, the first bushing being configured to be positioned and secured to an end of a first link of a wishbone suspension assembly, and an insert that fits within the slot, the insert having a locating hole that positions a bolt within the slot for nominal caster and camber angles.

In an additional aspect of the present disclosure, the insert is one of a plurality of inserts.

In another aspect of the present disclosure, at least one of the plurality of inserts has a locating hole at a nominal position.

In another aspect of the present disclosure, at least one other of the plurality of inserts has a locating hole offset from the nominal position.

In another aspect of the present disclosure, each of the plurality of inserts has a locating hole with a position in the respective insert that is different than the position of the locating hole of any other insert.

In another aspect of the present disclosure, the wishbone suspension assembly includes a second link and a second bushing being configured to be positioned and secured to an end of a second link of a wishbone suspension assembly, the second bushing having a slot for a second insert.

In another aspect of the present disclosure, the insert is one of a plurality of inserts.

In another aspect of the present disclosure, at least one of the plurality of inserts has a locating hole at a nominal position.

In another aspect of the present disclosure, at least one other of the plurality of inserts has a locating hole offset from the nominal position.

According to several aspects, a wishbone suspension assembly includes a first link, a second link, the first link and the second link joined together to form a y-shaped assembly, a first bushing with a first slot, the first bushing being positioned and secured to an end of the first link, a second bushing with a second slot, the second bushing being positioned and secured to an end of the second link, and a plurality of inserts, each of the plurality of inserts being configured to fit within the first slot and the second slot, each of the inserts having a locating hole that positions a bolt within the slot for nominal caster and camber angles.

In another aspect of the present disclosure, at least one of the plurality of inserts has a locating hole at a nominal position.

In another aspect of the present disclosure, at least one other of the plurality of inserts has a locating hole offset from the nominal position.

In another aspect of the present disclosure, each of the plurality of inserts has a locating hole with a position in the respective insert that is different than the position of the locating hole of any other insert.

According to several aspects, a method of aligning a wishbone suspension assembly of a motor vehicle includes measuring a caster angle, measuring a camber angle, and selecting a first insert and a second insert, the first insert fitting into a first slot of a first bushing, the first bushing being positioned and secured to an end of a first link of the wishbone suspension assembly, the second insert fitting into a second slot of a second bushing, the second bushing being positioned and secured to an end of a second link of the wishbone suspension assembly. Each of the first and second inserts has a locating hole that positions a respective bolt within the respective slot for nominal caster and camber angles.

In another aspect of the present disclosure, each of the first and second inserts is one of a plurality of inserts.

In another aspect of the present disclosure, at least one of the plurality of inserts has a locating hole at a nominal position.

In another aspect of the present disclosure, at least one other of the plurality of inserts has a locating hole offset from the nominal position.

In another aspect of the present disclosure, each of the plurality of inserts has a locating hole with a position in the respective insert that is different than the position of the respective locating hole of any other insert.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
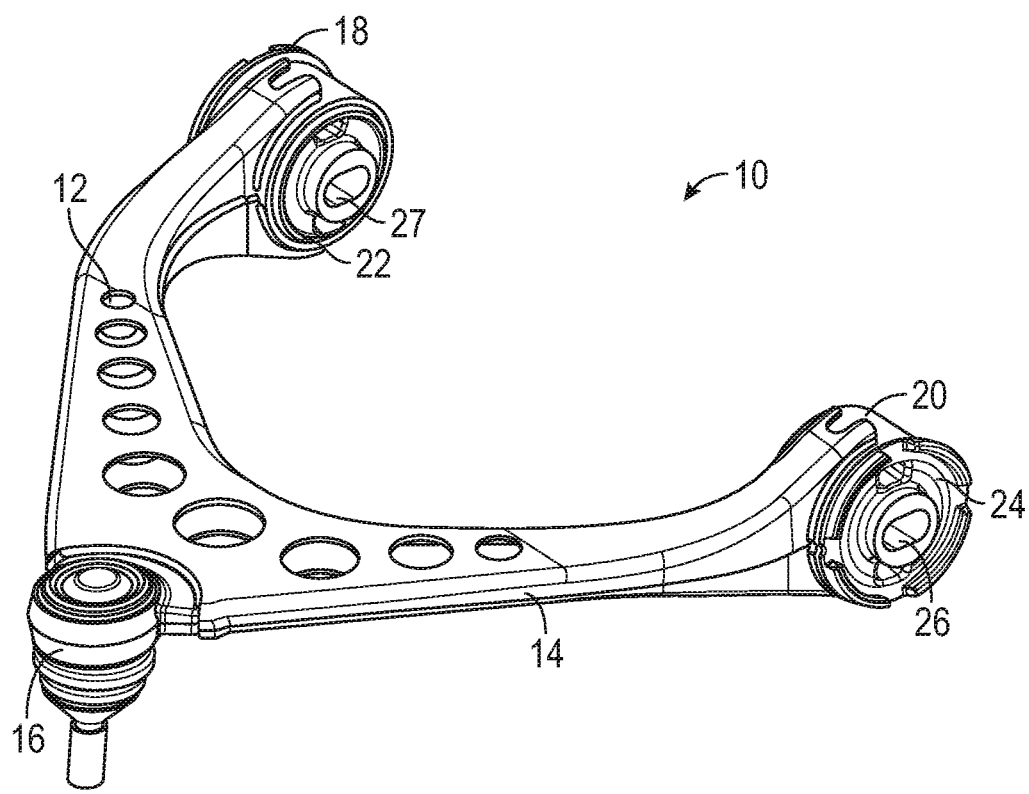
FIG. 1A shows a wishbone suspension assembly according to an exemplary embodiment.

The following description is merely exemplary in nature and is not intended to limit the present disclosure, application, or uses. Referring to FIG. 1A, there is shown a wishbone suspension assembly 10 for a motor vehicle. The wishbone suspension assembly 10 includes a first link 12 and a second link 14 joined together at an attachment unit 16. The first link 12 includes an end portion 18 in which a first bushing 22 is positioned and secured. The second link 14 includes an end portion 20 in which a second bushing 24 is secured and positioned. The attachment unit 16 is attached to a linkage associated with a wheel assembly of the motor vehicle, while the first and second bushings 18 and 20 are attached to the motor vehicle's body with, for example, bolts that extend through location holes of inserts that are fitted in the slots 26 and 27, as described below.

Figure 1B:
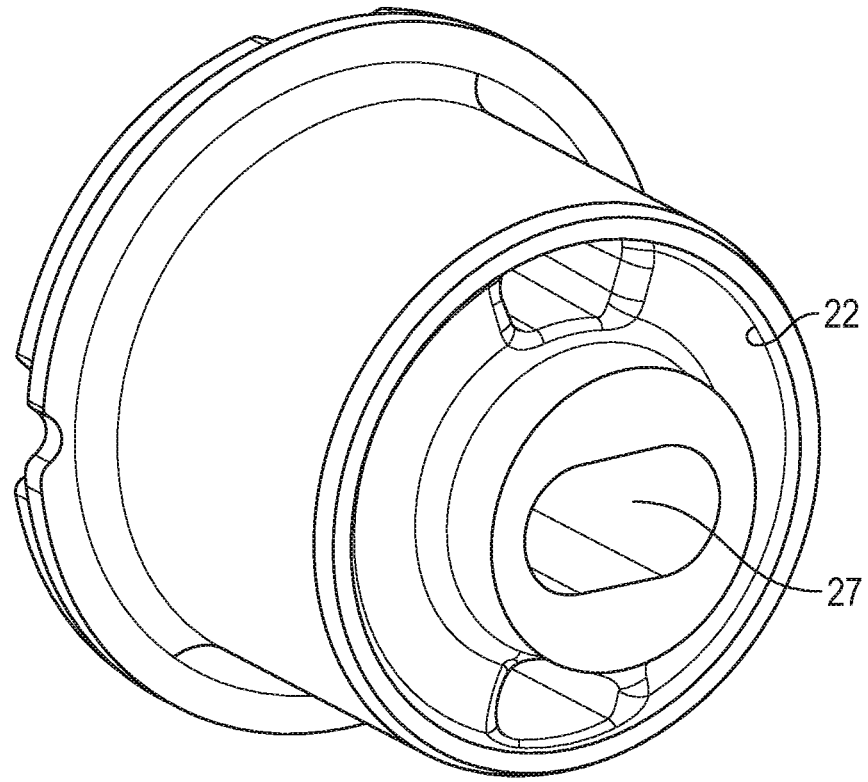
FIG. 1B shows a bushing of the wishbone suspension assembly shown in FIG. 1A according to an exemplary embodiment.
Figure 1C:
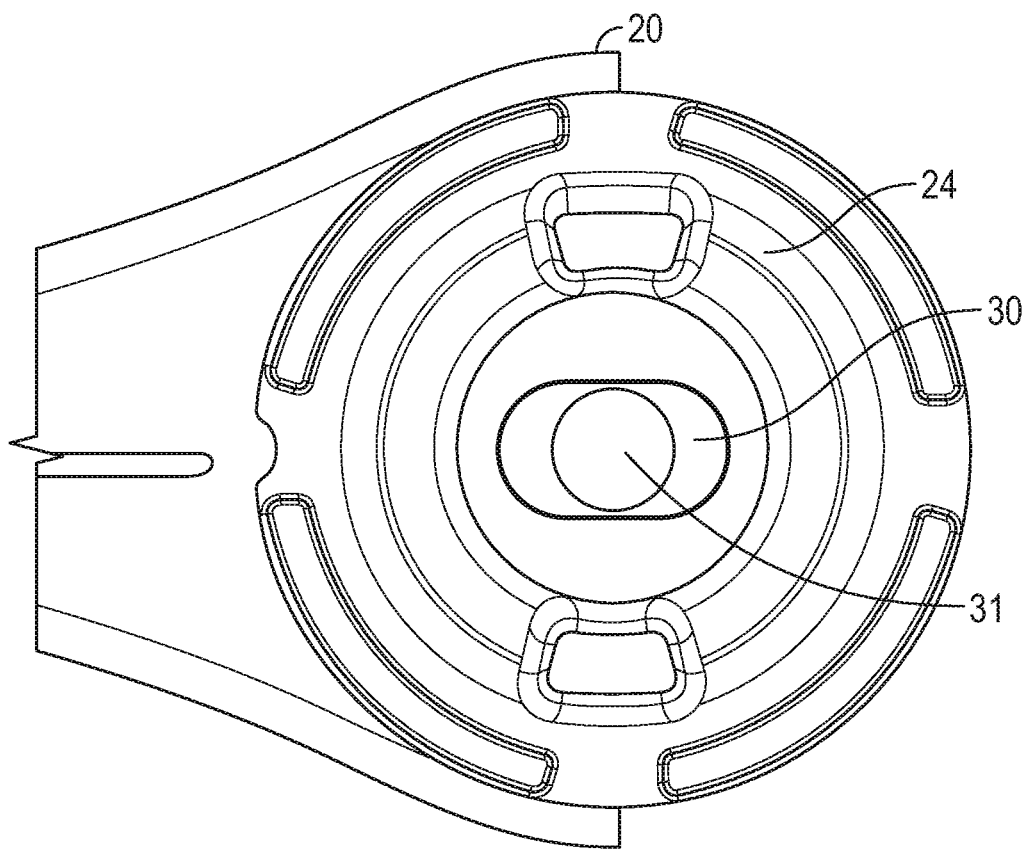
FIGS. 1C and 1D show another bushing of the wishbone suspension assembly shown in FIG. 1A according to an exemplary embodiment.
Figure 1D:
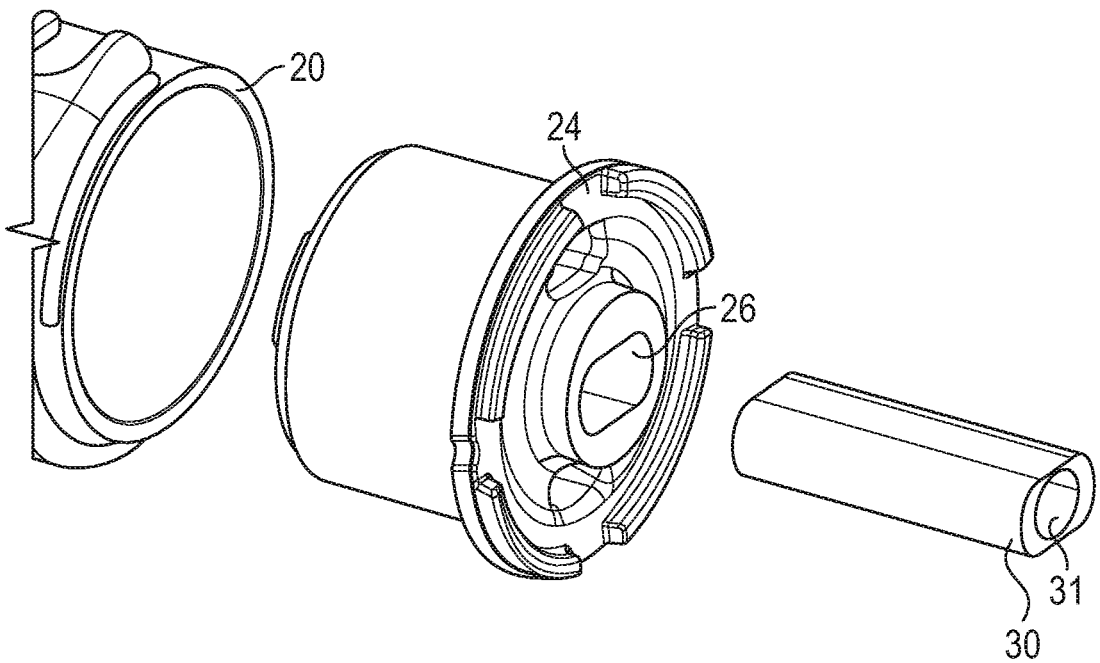

Referring further to FIGS. 1B and 1C, there are shown a close-up view of the bushing 22 with a slot 27 and the bushing 24 with a slot 26. When the motor vehicle is delivered to a customer, an insert 30 is typically fitted in each of the slots 26 and 27. Each insert 30 has a location hole 31 through which a bolt is placed to attached the bushings 22 and 24, and hence the links 12 and 14, to the motor vehicle's body for nominal caster and camber alignment for the wheel assembly associated with the wishbone suspension assembly 10.

Figure 2A:
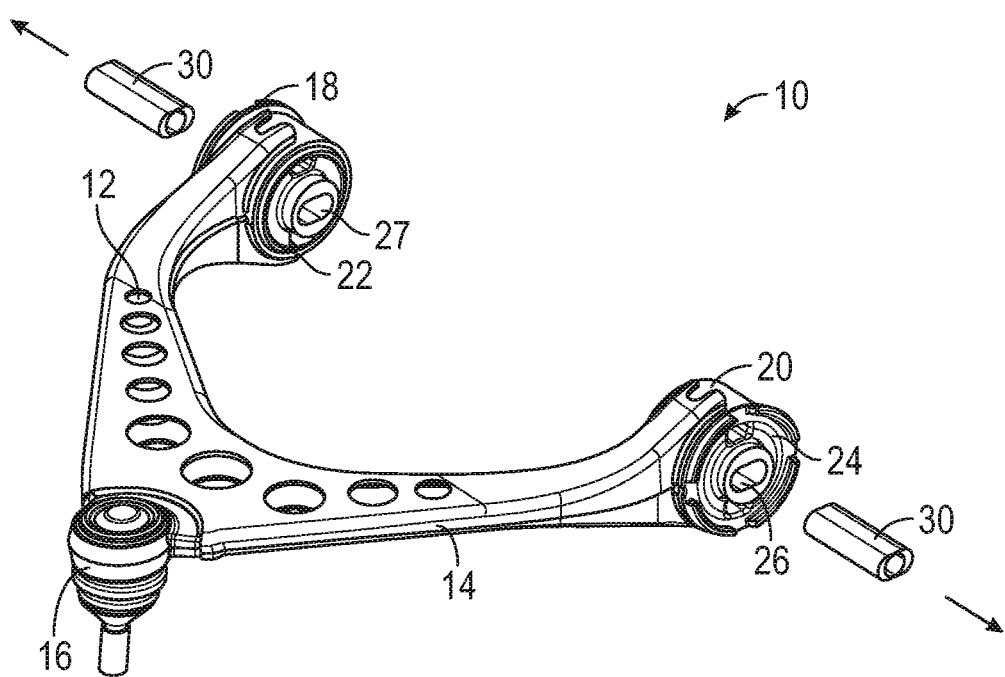
FIG. 2A show the removal of inserts from the bushings of the wishbone suspension assembly according to an exemplary embodiment.
Figure 2B:
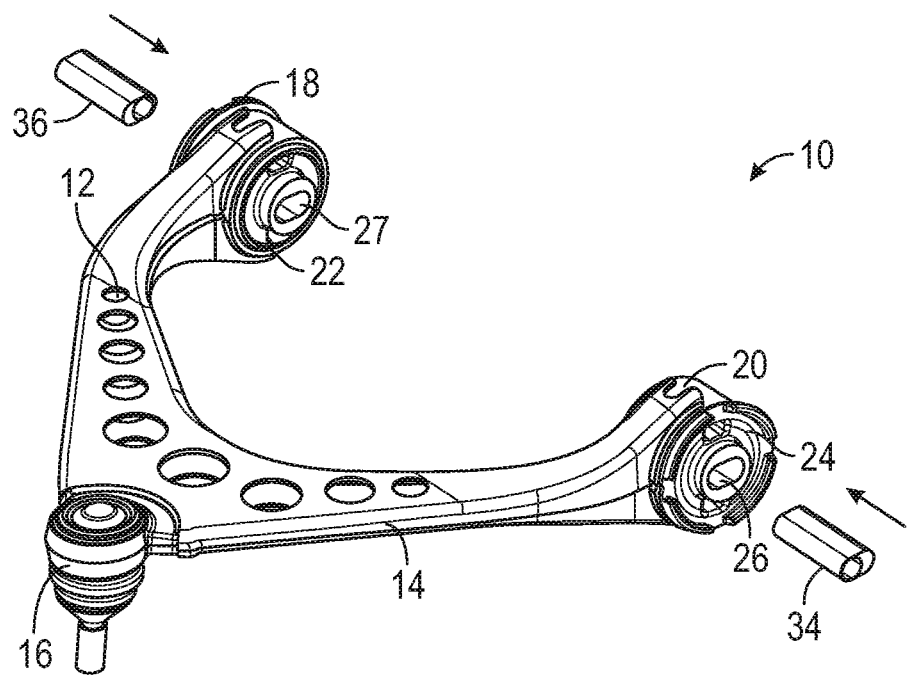
FIG. 2B show the placement of alternative inserts into the bushings according to an exemplary embodiment.

During routine maintenance of the motor vehicle, a technician may determine that the camber and/or caster angles have deviated from the nominal values for a particular wishbone suspension assembly 10. As such, in accordance with the principles of the present disclosure, the technician removes one or both inserts 30 from the bushings 22 and/or 24, as shown in FIG. 2A. The technician then places alternative bushings 34 and/or 36 in the respective slots 26 and 27, as shown in FIG. 2B.

Figure 3A:
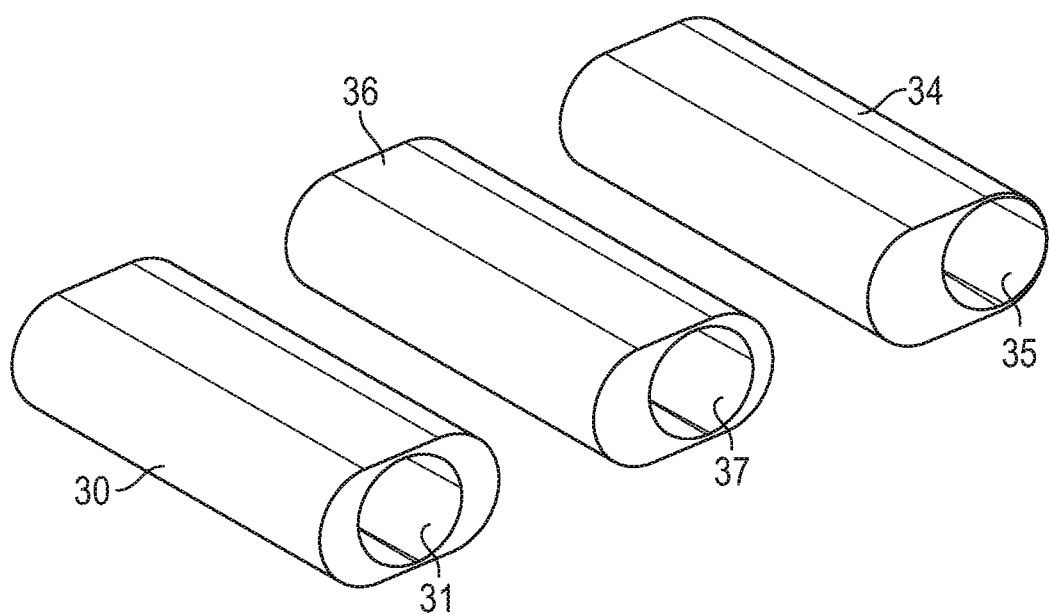
FIG. 3A show a set of inserts according to an exemplary embodiment.
Figure 3B:
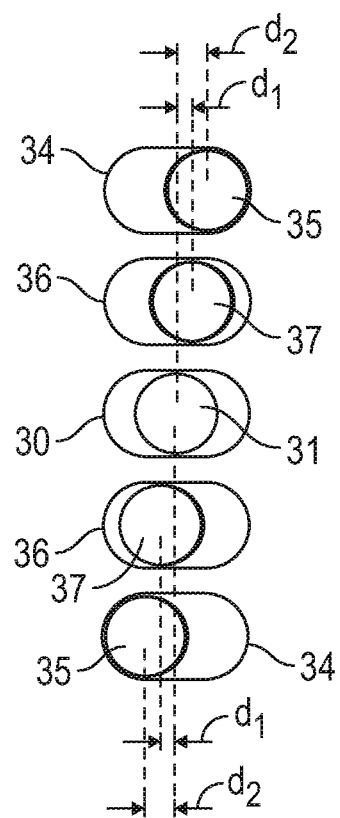
FIG. 3B show the offsets from a nominal location hole position of the inserts shown in FIG. 3A.

The inserts 30, 34 and 36 are made of plastic in particular arrangements (or metal, such as aluminum, in other arrangements) and can be color coded to indicate the offset from the nominal location hole position. For example, as shown in FIGS. 3A and 3B, the original insert 30 has a location hole 31, while the insert 34 has a location hole 35 offset from the location hole 31 by an amount $d_2$ and the insert 36 has a location hole 37 offset from the location hole 31 by an amount $d_1$. Note as shown in FIG. 3B, by merely flipping the inserts 34 and 36 over, the two inserts 34 and 35 provide four different offsets from the nominal insert 30. Further note that the disclosure is not limited to just the three inserts 30, 34 and 36. In various arrangements, there are a multitude of inserts, for example, with offsets less than $d_1$ and between $d_1$ and $d_2$. As mentioned above, the inserts are color to indicate the amount of offset from the nominal value. For example, the nominal insert 30 is one color, while the insert 34 is another color and the insert 36 is yet another color different from the colors of the inserts 30 and 34.

Figure 4:
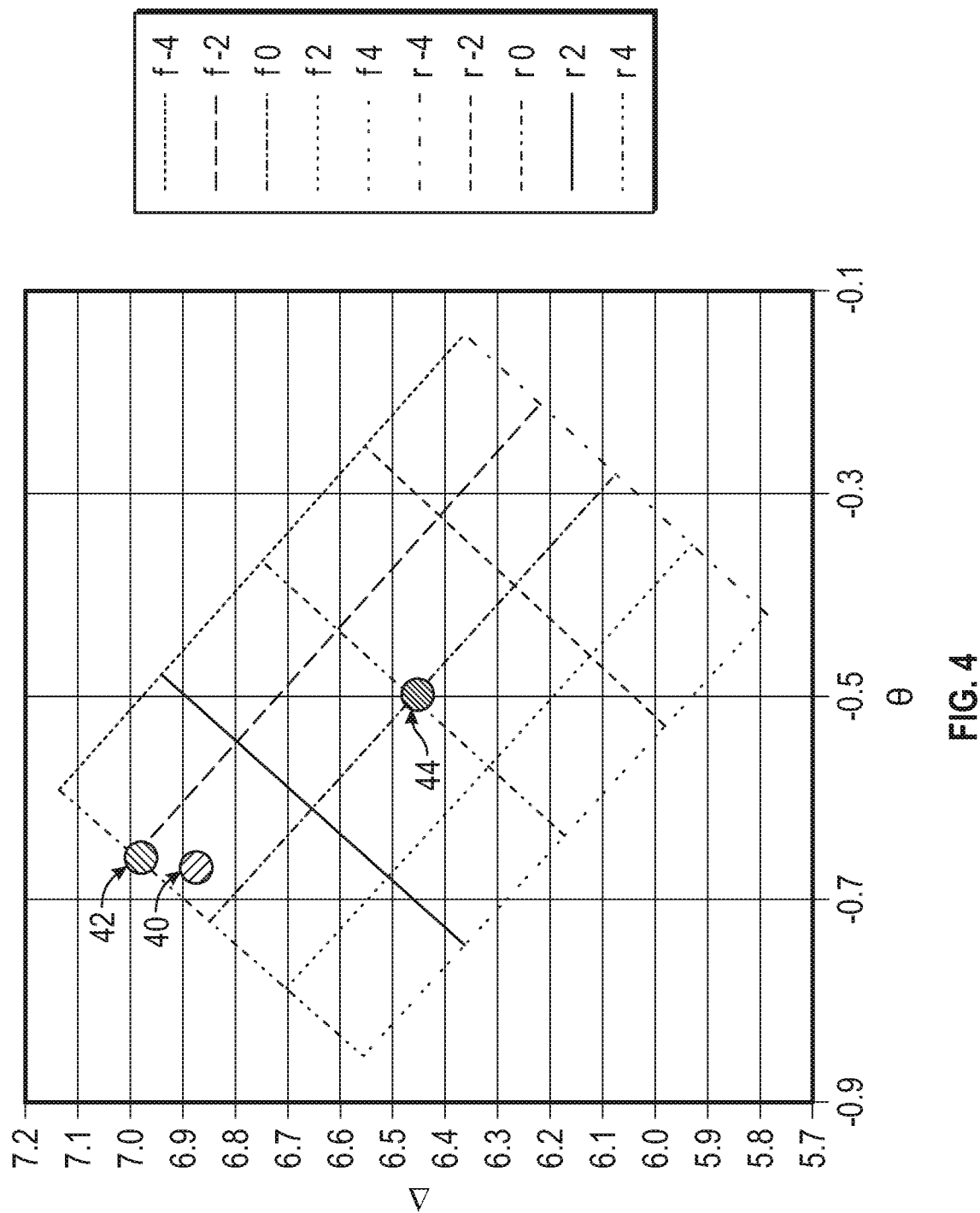
FIG. 4 is a chart for the selection of inserts for nominal caster and camber angles.

Turning now to FIG. 4, there is shown an alignment chart with caster angles, Δ, and camber angles θ with a set of keys listed on the right of the chart for the insert curves shown in the chart. In the set of keys, the bushing 22 is associated with f−4, f−2, f 0, f 2, and f 4, while the bushing 24 is associated with r−4, r−2, r 0, r 2 and r 4. The f insert curves go downward from left to right, and the r insert curves go upwards from left to right. The positive values indicate that the inserts, for example 34 and 36, are orientated with their respective location holes inboard in the vehicle and the negative values indicate that the inserts are orientated with their respective location holes outboard in the vehicle. Further, the offset d1 is indicated by the number 2 and the offset $d_2$ is indicated by the number $d_4$.

When the motor vehicle is brought in for service, the technician measures the camber and the caster for each wishbone suspension assembly in comparison to the nominal (desired) alignment indicated by the dot 44. In the particular example shown in FIG. 4, the measured alignment (caster and camber) for a particular wishbone is indicated by the dot 40. The technician then identifies the closet intersection of the insert curves to the measured value. In this particular case, the closest intersection is identified by the dot 42, which is the intersection of the f−2 curve and the r 4 curve. As such, the technician would choose the insert 36 with its location hole 37 oriented outboard for the bushing 22 and the insert 34 with its location hole 35 oriented inboard for the bushing 24.

A slotted alignment bushing of the present disclosure offers several advantages: the technician can quickly choose a set of inserts to quick wheel alignment thereby reducing costs associated with the wheel alignment procedure; by being able to flip the inserts, each insert provides the potential for two offsets from the nominal position; the assembly 10 does not require any complicated cam or machine adjustment system; the assembly 10 eliminates the need to pierce slots and assemble pre-drilled cams to the motor vehicle frame; the use of chart shown in FIG. 4 eliminates guesswork; and the assembly 10 eliminates the tendency of service garages to drill out locating holes or bend struts to achieve a desired alignment geometry.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A wishbone suspension assembly comprising:
   a first link;
   a second link, the first link and the second link joined together to form a y-shaped assembly;
   a first bushing with a first slot, the first bushing being positioned and secured to an end of the first link;
   a second bushing with a second slot, the second bushing being positioned and secured to an end of the second link; and
   a plurality of inserts, each of the plurality of inserts being configured to fit within the first slot and the second slot, each of the inserts having a locating hole that positions a bolt within the slot for nominal caster and camber angles, wherein each of the plurality of inserts are rotationally fixed to the first bushing or the second bushing when inserted into the first slot or the second slot and the locating holes allow relative rotation between the bolt and the plurality of inserts while locating the bolt relative to the first bushing or the second bushing, and wherein each of the plurality of inserts completely surrounds a respective locating hole formed in the insert.

2. The assembly of claim 1, wherein at least one of the plurality of inserts has a locating hole at a nominal position.

3. The assembly of claim 2, wherein at least one other of the plurality of inserts has a locating hole offset from the nominal position.

4. The assembly of claim 2, wherein each of the plurality of inserts has a locating hole with a position in the respective insert that is different than the position of the locating hole of any other insert.

5. A method of aligning a wishbone suspension assembly of a motor vehicle, the method comprising:
   measuring a caster angle relative to a desired caster angle;

measuring a camber angle relative to a desired camber angle;

providing an insert curve table, wherein the insert curve table maps a plurality of inserts relative to caster angles and camber angles for the wishbone suspension assembly, wherein each of the plurality of inserts defines an insert curve on the insert curve table;

identifying an intersection of a first insert curve of a first insert with a second insert curve of a second insert, wherein the intersection is closest to the measured caster angle and camber angle in the insert curve table; and inserting the first insert into a first bushing of the wishbone suspension assembly and inserting the second insert into a second bushing of the wishbone suspension assembly, the first insert fitting into a first slot of the first bushing, the first bushing being positioned and secured to an end of a first link of the wishbone suspension assembly, the second insert fitting into a second slot of the second bushing, the second bushing being positioned and secured to an end of a second link of the wishbone suspension assembly, wherein each of the first and second inserts having a locating hole that positions a respective bolt within the respective slot for nominal caster and camber angles.

6. The method of claim 5, wherein at least one of the plurality of inserts has a locating hole at a nominal position.

7. The method of claim 6, wherein at least one other of the plurality of inserts has a locating hole offset from the nominal position.

8. The method of claim 6, wherein each of the plurality of inserts has a locating hole with a position in the respective insert that is different than the position of the respective locating hole of any other insert.

\* \* \* \* \*